US012715297B2

(12) United States Patent
Fan et al.

(10) Patent No.: US 12,715,297 B2
(45) Date of Patent: Aug. 25, 2026

(54) EJECTABLE BATTERY SYSTEM FOR AN AIRCRAFT

(71) Applicant: Textron Innovations Inc., Providence, RI (US)

(72) Inventors: Yue Fan, Seattle, WA (US); Tjepke Herringa, Dallas, TX (US); Albert G. Brand, North Richland Hills, TX (US)

(73) Assignee: Textron Innovations, Inc., Providence, RI (US)

( * ) Notice: Subject to any disclaimer, the term of this patent is extended or adjusted under 35 U.S.C. 154(b) by 614 days.

(21) Appl. No.: 18/063,308

(22) Filed: Dec. 8, 2022

(65) Prior Publication Data

US 2024/0190251 A1 Jun. 13, 2024

(51) Int. Cl.

*B60L 3/00* (2019.01)
*B60L 53/80* (2019.01)
*B64D 1/12* (2006.01)

(52) U.S. Cl.

CPC ............. *B60L 3/0046* (2013.01); *B60L 53/80* (2019.02); *B64D 1/12* (2013.01); *B60L 2200/10* (2013.01)

(58) Field of Classification Search

CPC ........ B60L 3/0046; B60L 3/00; B60L 3/0023; B60L 53/80; B60L 2200/10; B64D 1/12; B64D 1/00; B64D 1/08; B64D 1/02

See application file for complete search history.

(56) References Cited

U.S. PATENT DOCUMENTS

| | | | | |
|---|---|---|---|---|
| 8,393,580 | B2 * | 3/2013 | Droney | B64D 27/31 244/62 |
| 8,511,613 | B2 * | 8/2013 | Droney | B64C 7/02 244/62 |
| 9,650,138 | B2 * | 5/2017 | Yates | B64D 33/00 |
| 9,845,158 | B2 * | 12/2017 | Liske | B64D 27/357 |
| 10,392,103 | B2 * | 8/2019 | Bourne | B64U 50/19 |
| 11,124,314 | B2 * | 9/2021 | Tillotson | H02J 7/342 |
| 11,273,911 | B2 * | 3/2022 | Brand | B64D 27/31 |
| 11,299,024 | B2 * | 4/2022 | Linde | B64C 31/024 |
| 11,682,917 | B1 * | 6/2023 | Piasecki | B64C 1/068 307/9.1 |
| 11,999,509 | B2 * | 6/2024 | Mackay | B60L 53/16 |
| 12,116,131 | B2 * | 10/2024 | Dalton | H01M 50/502 |
| 12,338,011 | B2 * | 6/2025 | Khattar | H01M 10/486 |
| 12,451,556 | B2 * | 10/2025 | Ahn | B64C 3/185 |
| 12,466,261 | B2 * | 11/2025 | Gomes | B64D 25/00 |
| 12,515,794 | B2 * | 1/2026 | Lewin | B64D 1/10 |
| 12,545,404 | B2 * | 2/2026 | Seki | B64D 1/02 |

(Continued)

*Primary Examiner* — James M Dolak

(74) *Attorney, Agent, or Firm* — Whitaker Chalk Swindle & Schwartz PLLC; Enrique Sanchez, Jr.; Juan Vasquez

(57) ABSTRACT

An ejectable battery system for an aircraft is presented. In one embodiment, the present disclosure provides for a battery pack that can be ejected from the aircraft in the event of a thermal runaway, aircraft malfunction, or impending crash. After ejection the battery can remain attached to the aircraft through a retaining tether. A shock absorber in-line with the tether can decrease tether loads. The present disclosure provides an ejectable battery system capable of detecting a battery pack thermal runaway, aircraft malfunction, or impending crash, opening an aircraft battery hatch, ejecting the battery pack from the aircraft, and retaining the battery pack outside of the aircraft via a tether.

11 Claims, 7 Drawing Sheets

(56) References Cited

U.S. PATENT DOCUMENTS

| | | | | |
|---|---|---|---|---|
| 2004/0211862 | A1* | 10/2004 | Elam | B64U 20/83<br>244/58 |
| 2015/0336677 | A1* | 11/2015 | Smaoui | H01R 24/38<br>320/109 |
| 2018/0159110 | A1* | 6/2018 | Tuomola | B60L 53/80 |
| 2021/0291996 | A1* | 9/2021 | Bosma | B64D 31/16 |

* cited by examiner

EJECTABLE BATTERY SYSTEM FOR AN AIRCRAFT

TECHNICAL FIELD

The present disclosure generally relates to aircraft battery malfunctions, and more specifically to ejectable battery systems for aircraft.

BACKGROUND

Modern aircraft rely more and more on electrical power, including hybrid aircraft and all-electric aircraft. Hybrid aircraft include combustible fuel and batteries to power aircraft systems. All-electric aircraft (e.g., electric Vertical Take-Off and Landing ("eVTOL") aircraft) require large batteries to power the aircraft's propulsion, communication, and control systems. Traditional batteries require corresponding apparatus to aggregate electric potential and manage battery elements. The individual cells in a battery module can have different capacities or health levels, so, over the course of charge and discharge cycles, can be at different states of charge (SOC). Variations in capacity can be due to manufacturing variances, assembly variances (e.g., cells from one production run mixed with others), cell aging, impurities, or environmental exposure (e.g., some cells may be subject to additional heat from nearby sources like motors, electronics, etc.), and can be exacerbated by the cumulative effect of parasitic loads.

Batteries for such aircraft may suffer from a condition known as thermal runaway, which can lead to fire and endanger the occupants. High temperatures are difficult to contain away from structural components, and prolonged containment of smoke and fire is difficult to achieve. In addition to this fire risk, batteries are heavy, which leads to increased crash loads and high impact energies to be absorbed by the landing gear and structure.

SUMMARY

The present disclosure achieves technical advantages as an ejectable battery system for an aircraft. In one embodiment, the present disclosure provides for a battery pack/module that can be ejected from the aircraft in the event of a thermal runaway, aircraft malfunction, or impending crash. After ejection the battery can remain attached to the aircraft through a retaining tether. A shock absorber in-line with the tether can decrease tether loads. Ultimately, the tether may be released, allowing the battery to fall, prior to landing the aircraft.

The present disclosure solves the technological problem of removing a battery undergoing thermal run-away from aircraft proximity to remove danger to possible occupants or further aircraft damage. Typically, batteries are static aircraft components that are not readily accessible. The present disclosure provides a technological solution to the technological problem by providing an ejectable battery system capable of detecting a battery module thermal runaway, aircraft malfunction, or impending crash, opening an aircraft battery hatch, ejecting the battery pack/module from the aircraft, and retaining the battery pack and/or module outside of the aircraft via a tether and optionally detaching the tether to allow the load to drop prior to landing. In some embodiments (particularly in the fuselage), battery ejection may not include a hatch where the battery pack and/or module is positioned flush with the exterior of the aircraft in normal operation. Jettisoning dead weight can enable a safe landing if a portion of the aircraft power is lost. For example, if a twin engine aircraft is lifting a sling load and one engine malfunctions, the pilot can "pickle" (e.g., jettison) the load, allowing the aircraft to land safely on one engine. The load can be selectively jettisoned once the aircraft is clear of persons and/or property on the ground.

For example, battery packs can be massive—weighing hundreds of pounds each. Typically, several-thousand pounds of battery are required for eVTOLs because vertical take-off is far more energy intensive than wing-borne flight. Battery pack/module ejection may include moving the remaining packs/modules within the airframe to maintain the aircraft's center of gravity as a pack/module gets ejected. Battery pack/module ejection may also include symmetric ejection. In another embodiment, a control system can detect ejection conditions, such as thermal runaway or other aircraft malfunction, and control the opening of the battery hatch, electrical decoupling, and mechanical decoupling. In another embodiment, an extendable tether selectively couples the battery module to the aircraft after ejection of the battery pack/module so the battery pack/module does not freefall, causing potentially catastrophic damage below. After ejecting the battery module from the aircraft, aerodynamics (e.g., wings, parachutes, etc.) can position the battery module aft of the aircraft's center, to for example, prevent a fire from damaging the exterior of the aircraft. The remaining aircraft battery packs may be repositioned via a load management system to maintain the aircraft center of gravity while a battery pack/module undergoes the process of ejection, tethering, and/or release. For example, the load management system can include internal railing, combined with pack/module wheels to allow actuators to reposition the packs/modules to maintain the aircraft's center of gravity via one or more actuators coupled to the internal railing and/or the wheels of the packs/modules. Additionally, the load management system can include a processor and one or more sensors, configured to identify an imbalance of the aircraft and reposition the aircraft's remaining onboard battery packs to retain the aircraft center of gravity during and after battery pack ejection, up to and including release.

It is an object of the disclosure to provide an ejectable battery system. It is a further object of the disclosure to provide a method of ejecting a battery or portion of a battery system from an aircraft during flight. These and other objects are provided by the present disclosure, including at least the following embodiments.

In one embodiment, an ejectable battery system, can include: an aircraft; a battery pack/module disposed within the aircraft and configured to provide power to the aircraft; a battery hatch configured to eject the battery pack/module from the aircraft during flight; and a tether operably coupled to the aircraft and the battery pack/module and configured to selectively retain the battery pack/module proximate the aircraft. Wherein the battery pack/module is disposed within a fuselage of the aircraft. Wherein the battery pack/module is disposed within a wing of the aircraft. Further comprising a shock absorber operably coupled to the tether and the aircraft and configured to reduce the peak tether load. Wherein the battery pack/module is ejected during a thermal runaway failure of the battery pack/module or aircraft malfunction. Wherein the crash energy of the aircraft's structure is decreased after battery module ejection. Wherein the battery module is a part of a swappable battery system. Wherein electrical reconfiguration and disconnection of the battery module occurs prior to ejection. Further comprising aerodynamics operably coupled to the battery module and configured to aerodynamically position the tethered battery module aft of the aircraft's center. Further comprising a control system configured to maintain the aircraft center of gravity, manage disconnection, ejection, and optional de-tethering of a battery, or battery component. Further comprising a load management system configured to retain the aircraft center of gravity during and after battery pack ejection, up to and including release of the battery pack. Wherein the tether can be a conducting tether configured to maintain electrical continuity between the ejected battery pack and the aircraft to allow the ejected battery to continue to deliver power to the aircraft In another embodiment, a method of ejecting a battery from an aircraft during flight, can include: detecting a battery module thermal runaway or aircraft malfunction; opening an aircraft battery hatch; ejecting the battery module from the aircraft; retaining the battery module outside of the aircraft via a tether; continuing to extract power from the tethered battery; and releasing the tether to allow the battery to depart from the aircraft. Further comprising reducing a peak load of the battery ejection via a tether and/or shock absorber operably coupled between the ejected battery module and the aircraft. Further comprising deploying aerodynamics operably coupled to the battery module and configured to aerodynamically position and stabilize the tethered battery module to align favorably with the aircraft's center of gravity (e.g., to retain aircraft stability, the tethered load path can "point" through or ahead of the aircraft center of gravity, or alternatively be aft of the aircraft's center). Wherein the aerodynamics include a collapsible wing. Wherein the aerodynamics include a parachute (e.g., a drogue parachute). Further comprising electrical reconfiguration and disconnection of the battery module prior to ejection of the battery module via a control system. Further comprising selectable separation of the battery module from the tether. Further comprising a titanium housing disposed over at least a portion of the compact battery module. Wherein disconnection, ejection, and optional de-tethering of the battery is automated. Wherein the automated de-tethering occurs at a predetermined altitude, airspeed, descent rate or other parameter.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

A typical eVTOL aircraft battery can be comprised of multiple modules arranged in battery packs. In one or more embodiments, a cell can be a single unit (e.g., electrochemical) device that can vary in size and shape; a module can be a group of cells connected in series and/or in parallel to create a unit that is used to provide containment; and a pack can refer to a group of modules arranged to provide the aircraft power source requirements. For example, the pack can be a line replaceable unit.

Figure 1:
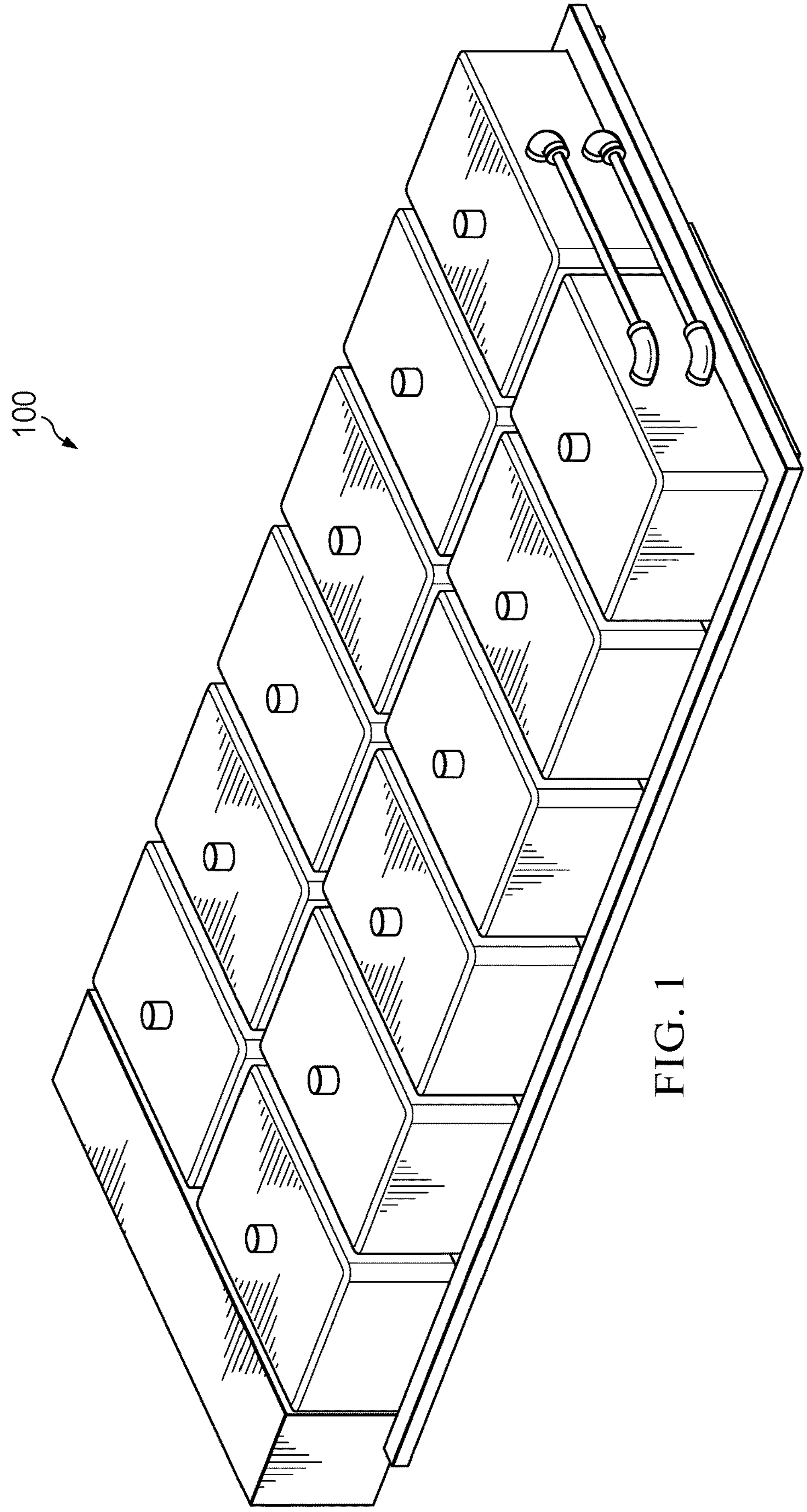
FIG. 1 is a perspective view of an aircraft battery pack, comprised of a plurality of battery modules, in accordance with one or more embodiments of the present disclosure. For example, a complete aircraft battery system may consist of multiple battery packs.

FIG. 1 is a perspective view of an aircraft battery pack 100, in accordance with one or more embodiments of the present disclosure. In one embodiment, several battery packs can provide sufficient energy to power an aircraft. A given battery pack, for example, may consist of 12 battery modules, each module containing an array of battery cells. If there is a thermal runaway in one battery cell, a fire can spread to the entire module, and ultimately the entire pack, other packs, and the aircraft. Since the battery pack is smaller than the aircraft battery system, the fire may be able to be contained, thereby mitigating the chances of thermal runaway propagating to the rest of aircraft battery system. In another embodiment, a titanium housing can protect the thermal runaway of one battery module from another battery module within the same battery pack. For example, the titanium housing can be a sheet metal, for example 020-thick (i.e., 0.020"). With temperatures rising to 1500 to 2000 degrees Celsius, or more, titanium can be well suited to handle such temperatures without melting at about half the weight of steel. In another embodiment, the battery 100 and all of its components can be disposed on a battery module shelf within the aircraft.

In one embodiment, a battery cell can have a cell body, a positive lead, and a negative lead. For example, a battery cell can be a Fully Max battery cell, a GM® Ultium® battery, a Tesla® 28700, or other suitable battery cell. In another embodiment, the cell body can be of any type, including wet cell or dry cell, with any chemistry, including lithium ion, alkaline, or nickel metal hydride (NIMH), to name a few. In another embodiment, each battery cell can include a positive terminal and a negative terminal configured to engage a load. Each terminal can be configured to engage a battery bus to receive the battery cell voltage to suit a particular application. In one embodiment multiple battery cells can be aggregated to form a battery module. In another embodiment, a battery can be comprised of two or more battery modules. In another embodiment, each battery module can include a titanium battery cover to aid in containing or dispersing heat.

In one embodiment, a control system can include a battery management unit (BMU) and/or a battery management system (BMS). A BMS can be present at the module level, cell level, or pack level, and a BMU at the battery system level. The BMS can have a battery cell balancer and/or a processor. In another embodiment, each battery module can have a BMS, and the whole battery can have a battery management unit (BMU), with connections to the aircraft and other components. In one embodiment, a BMS might include temperature monitoring, actuator control electrical decoupling, mechanical decoupling, active balancing, as well as charging, and other features to facilitate the safe operation of a battery pack.

Figure 2:
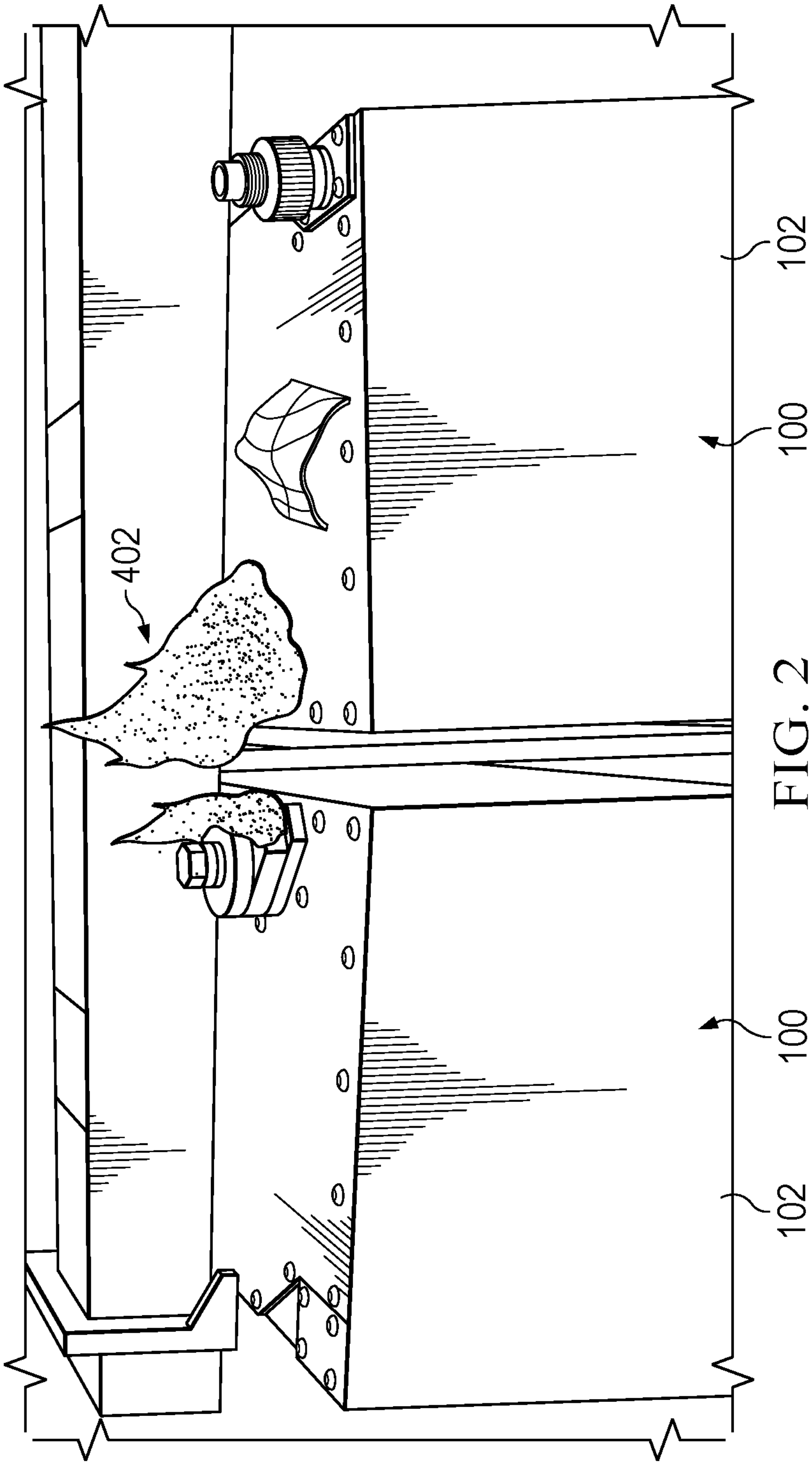
FIG. 2 is a perspective view of two battery modules on fire, after one battery module has experienced thermal run-away, in accordance with one or more embodiments of the present disclosure.

FIG. 2 is a perspective view of two battery modules of a battery pack 100 on fire, in accordance with one or more embodiments of the present disclosure. In one embodiment, multiple battery packs can provide sufficient energy to power an aircraft. For example, with 6 battery packs 100, the battery system can be modular, such that if there is a thermal runaway, the aircraft may still be operated with the remaining (functional) battery packs. By ejecting a single battery pack undergoing thermal runaway, the fire hazard is removed from the aircraft. The battery modules in each pack can have a housing 102 that provides sufficient fire containment protection to permit battery pack ejection during a thermal runaway. This feature can mitigate the chances of thermal runaway propagating to the rest of battery. In another embodiment, a battery housing 102 can protect the thermal runaway of one battery module from another battery module within the same battery. For example, the battery housing 102 can be a sheet metal, for example 020-thick. With temperatures rising to 1500 to 2000 degrees Celsius, or more, titanium can be well suited to handle such temperatures without melting at about half the weight of steel. In another embodiment, the battery pack 100 and all of its components can be disposed on a battery module shelf within the aircraft. For example, the battery module housing, shelf, or both, can have one or more deployable aerodynamics discussed below.

Figure 3:
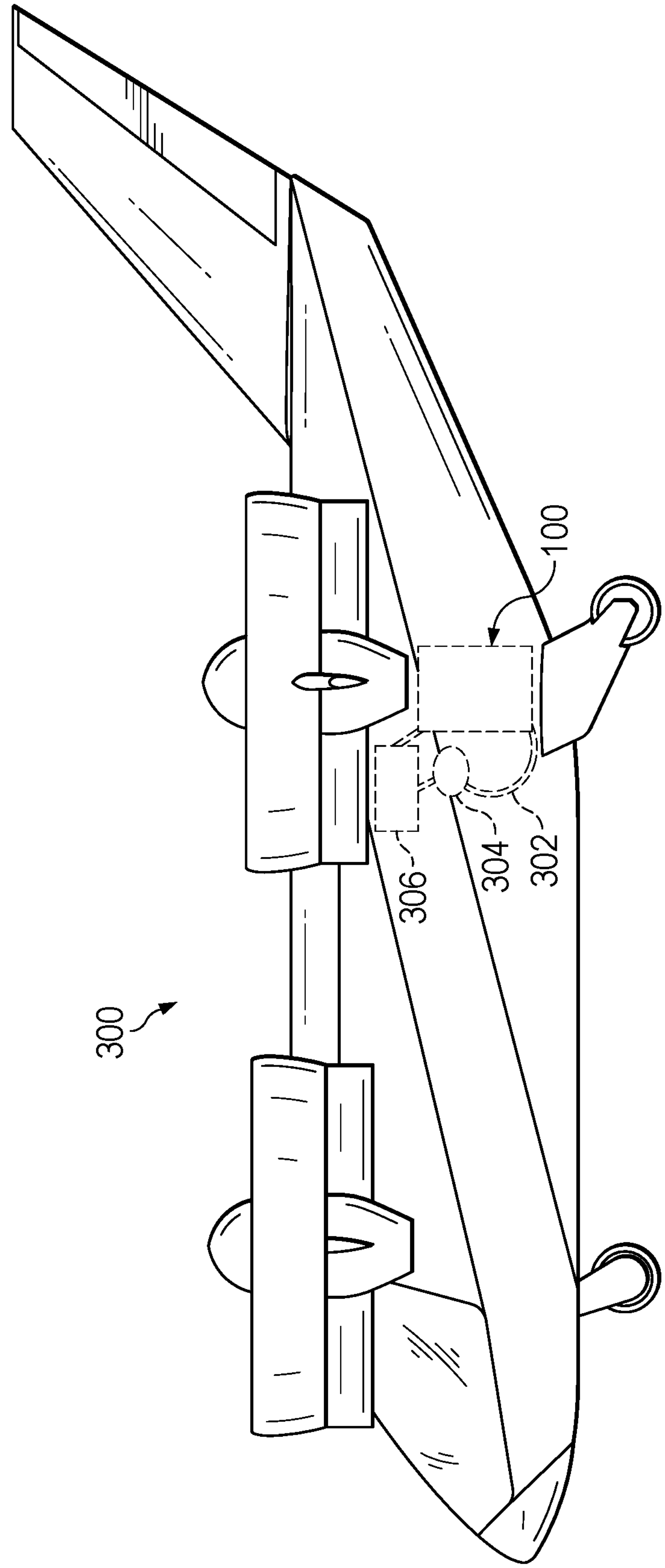
FIG. 3 is a perspective view of an eVTOL aircraft with an ejectable battery pack system, in accordance with one or more embodiments of the present disclosure.

FIG. 3 is a perspective view of an eVTOL aircraft 300 with an ejectable battery system, in accordance with one or more embodiments of the present disclosure. In one embodiment, the aircraft can be a rotorcraft, VTOL, eVTOL, or any suitable vehicle. The aircraft 300 can include an ejectable battery system, including a battery pack 100, a tether 302, a shock absorber 304, and a control system 306. In another embodiment, the battery pack 100 can be disposed within a fuselage of the aircraft 300, a wing of the aircraft 300, or any other suitable location. The tether 302, can be operatively coupled to the battery pack 100 and the aircraft 300. For example, the tether 302 can be coupled to the housing of the battery pack 100, the battery shelf of the battery pack 100, or any other suitable battery component. The tether 302 can be a cable made of metal, Kevlar, or any other suitable material. In another embodiment, the tether can contain conducting elements (e.g., wiring) to transfer power from the ejected battery to the aircraft. For example, in certain conditions, it can be advantageous to eject the battery pack and retain it externally on the tether but allow the battery pack to remain electrically connected to the aircraft. This allows the ejected battery/pack/module to continue providing power the aircraft via a conducting tether, as long as possible. Although a battery pack element (e.g., a cell) may be undergoing thermal runaway, there still may be significant power to be transferred from the ejected battery pack to extend aircraft operations. eVTOL aircraft require notoriously high power and may need to reduce power demand by shedding the ejected battery weight completely or may need to continue extracting power from the ejected battery if the thermal runaway condition is still allowing other modules/cells in the pack to generate power. In another embodiment, tether 302 can be retractable and/or extendable. For example, tether 302 can be retractable into a housing having a spring or winch operable to roll the tether 302 about an axis. In another example, tether 302 can have slack sufficient to retain an ejected battery pack 100 external to aircraft 300. In another embodiment the tether can be released to shed the ejected battery weight at an appropriate time, based on appropriate conditions.

In another embodiment, a shock absorber 304 can be operably coupled to tether 302 and the aircraft 300. Once ejected, turbulent air, along with changes in altitude and direction can exert forces on the battery pack 100 coupled to the tether 302. The shock absorber 304 can reduce the dynamic loads acting on the tether connection to prevent undesired decoupling or aircraft damage. In another embodiment, the shock absorber 304 can be a mechanical or hydraulic device designed to absorb and damp shock impulses by converting the kinetic energy of the shock into another form of energy, which is then dissipated. For example, the shock absorber 304 can include a system of springs and/or hydraulics capable of reducing a peak load of the tether 302.

In another embodiment, the control system 306 can include a processor, memory having computer-readable instructions, a BMU, and/or a BMS operably coupled to the battery pack 100, the shock absorber 304, the tether 302, and the flight control computer. In one embodiment, the BMU can control the thermal management systems such heat sensors and actuators, as well as the BMSs associated with each battery module. The BMU can also provide access to the power supplied by the battery via one or more electrical connectors, by electrically coupling or decoupling a battery pack 100. In another embodiment, the battery pack shelf can support at least a portion of the BMU. In another example, the BMS of a particular battery pack 100 can determine the temperature of modules within the battery pack 100 via one or more heat sensors. The BMS can also determine a malfunctioning battery cell/module/pack by one or more voltage, amperage, or power sensors operably coupled to a battery pack 100. For example, if the temperature or the output voltage of a particular battery module within pack 100 exceeds a predetermined threshold, the BMS can transmit a notification to the control system 306 indicating the problem. In another embodiment, the control system 306 can receive notifications from a flight control computer (FCC) disposed within the aircraft 300. For example, if the FCC determines that there is an aircraft malfunction, the control system 306 can initiate a battery pack 100 ejection process, for example, to reduce the weight of the aircraft. In another embodiment, the control system 306 can be operably coupled to actuators, sensors, processors, and other relevant devices of the aircraft 300.

Figure 4:
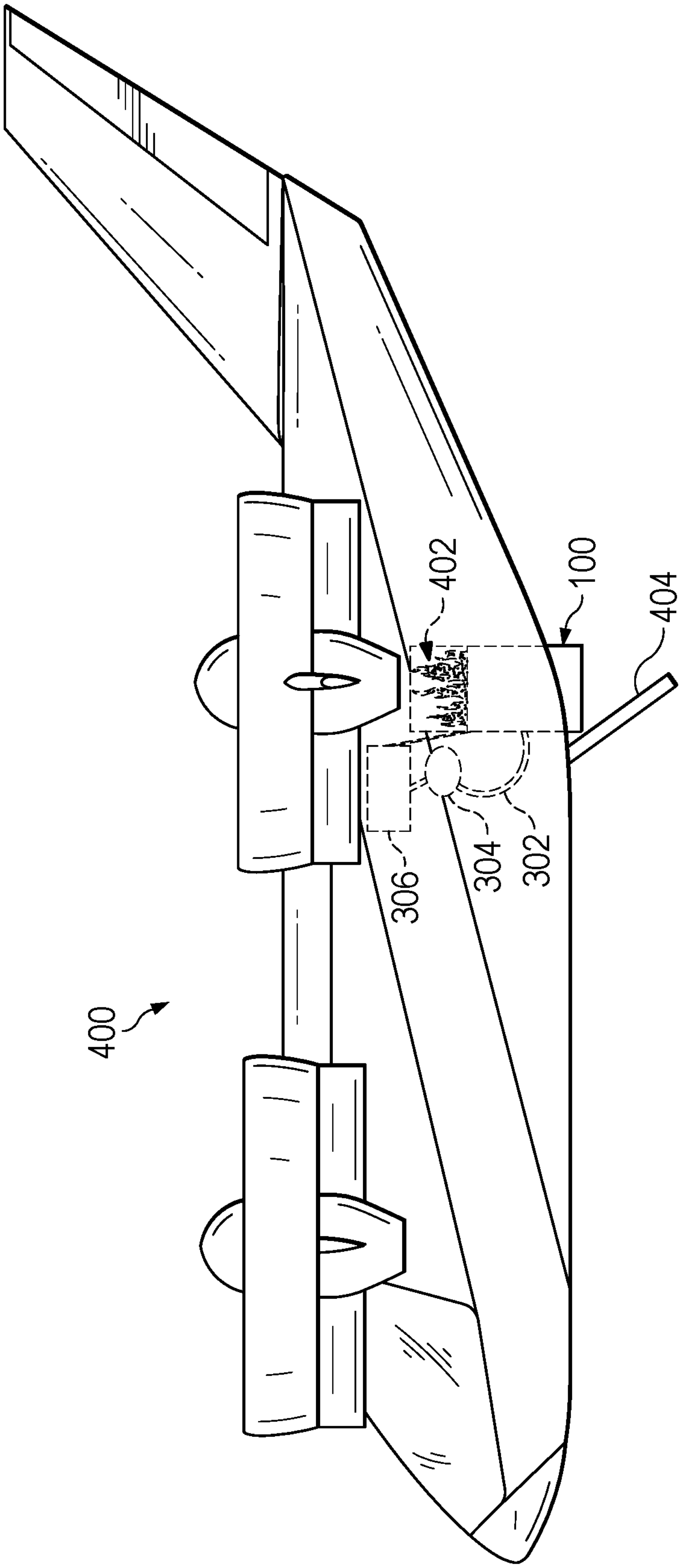
FIG. 4 is a perspective view of an eVTOL aircraft with an ejectable battery pack system and a battery module fire, in accordance with one or more embodiments of the present disclosure.

FIG. 4 is a perspective view of an eVTOL aircraft 400 with an ejectable battery system and a battery fire 402, in accordance with one or more embodiments of the present disclosure. In one embodiment, the aircraft 400 can include a battery hatch 404, door, or other externally accessible location. In operation, in another embodiment, a battery pack 100 can have a thermal run away such that a battery fire 402 starts within the aircraft 400. The control system 306 can detect the battery fire 402 of a specific battery module or pack 100. The control system 306 can then open the battery hatch 404 by activating one or more actuators operably coupled to the battery hatch 404. In some embodiments (particularly in the fuselage), battery pack 100 ejection may not include a hatch where the battery pack 100 and/or module is positioned flush with the exterior of the aircraft 400 (e.g., opening in the exterior of an aircraft) in normal operation. The control system 306 can also electrically decouple the battery pack 100 from the electrical system of aircraft 400. The control system 306 can also mechanically release the battery pack 100 from its secured location within the aircraft 400. For example, the control system 306 can operate actuators securing the battery pack 100 in place. In another embodiment, once the battery pack 100 is electrically and mechanically decoupled from the aircraft 400, the battery pack 100 can be ejected from the aircraft 400. For example, the battery pack 100 can be ejected from the aircraft 400 by an actuator controlled by the control system 306, gravity, or other suitable mechanism. One or more latches securing the battery pack 100 to the aircraft 400 can be controllable by one or more actuators operably coupled to the latches. Upon operation, the actuators can reposition the latches to disengage the battery pack 100 to allow its ejection from the aircraft 400. Although the triggering event can be a battery fire 402, any sort of aircraft malfunction or pilot action can trigger the ejection of the battery pack 100.

Figure 5:
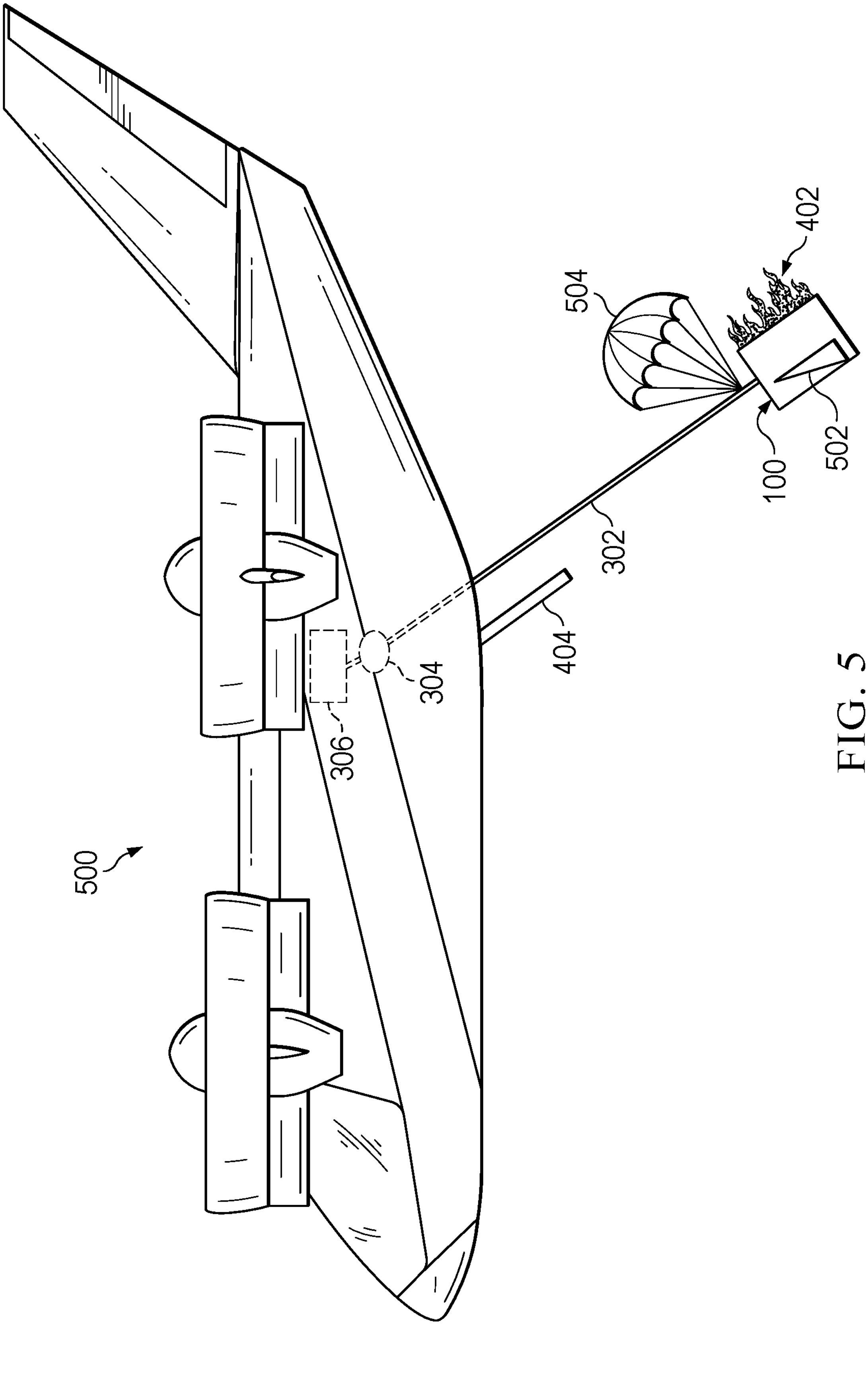
FIG. 5 is a perspective view of an eVTOL aircraft with an ejected battery module, in accordance with one or more embodiments of the present disclosure.

FIG. 5 is a perspective view of an eVTOL aircraft 500 with an ejected battery pack 100, in accordance with one or more embodiments of the present disclosure. In one embodiment, once ejected from the aircraft 500, the battery pack 100 can be retained external to the aircraft 500 via a tether 302. Once the battery pack 100 has exited the aircraft 500, aerodynamics operatively coupled to the battery pack 100 can be deployed. For example, aerodynamics can include a wing 502, a parachute 504, or other suitable element sufficient to position and stabilize the battery pack 100. The wing 502 can be a collapsible wing operably coupled to a housing of the battery pack 100 or a battery pack tray operably coupled to the battery pack 100. The parachute 504 can be a releasable parachute operably coupled to a housing of battery pack 100 or a battery pack tray operably coupled to the battery pack 100. The control system 306 can deploy the wing 502 or the parachute 504 via one or more actuators coupled to the aerodynamics. The aerodynamics (e.g., including the aerodynamic features of the wing and parachute in conjunction with the cable attachment point relative to the aircraft's center of gravity) can position the battery pack 100 to preserve the aircraft controllability while extending the battery pack aft and below the aircraft's 500 center to mitigate damage to the aircraft 500 or the tether 302.

Once a battery is ejected during flight, turbulent air, along with changes in altitude and direction can exert forces on the battery pack 100 coupled to the tether 302. The shock absorber 304 can lessen the dynamic forces acting on the tether connection to prevent undesired decoupling or other damaging loads to the aircraft 500. In another embodiment, the shock absorber 304 can be a mechanical or hydraulic device controlled by the control system 306. In one embodiment, the tether 302 can be coupled to the shock absorber 304 or directly to the aircraft 500. The tether 302 can extend out of the aircraft 500 via the battery hatch 404 during flight.

The control system 306 can be operably coupled to the battery pack 100, the battery hatch 404, the tether 302, the shock absorber 304, the wing 502, the parachute 504, one or more actuators, the BMU, one or more BMSs, and the FCC, among others. Accordingly, the control system 306 can operate and deploy one or more aspects of the present disclosure, including operation of the battery hatch 404, electrical and mechanical decoupling of the battery pack 100, ejection of the battery pack 100, deploying of the wing 502 and the parachute 504, release of the tether 302, and operation of the shock absorber 304. For example, the control system 306 can operate one or more actuators associated with each of the aforementioned elements to facilitate their operation and control. For example, one or more wings 502 can be collapsibly coupled to the battery pack 100. One or more actuators, (e.g., rams) operably coupled to the battery pack 100 and the wings 502 can be initialized to position the wings 502 to create an aerodynamic effect. Additionally, the control system 306 can initiate deployment of the parachute 504 by triggering the ignition of solid propellant inside the parachute 504 to generate inert gas used to expand the parachute 504. The control system 306 can then trigger actuators operably coupled to the battery hatch 404 to close the battery hatch 404, if necessary.

Figure 6:
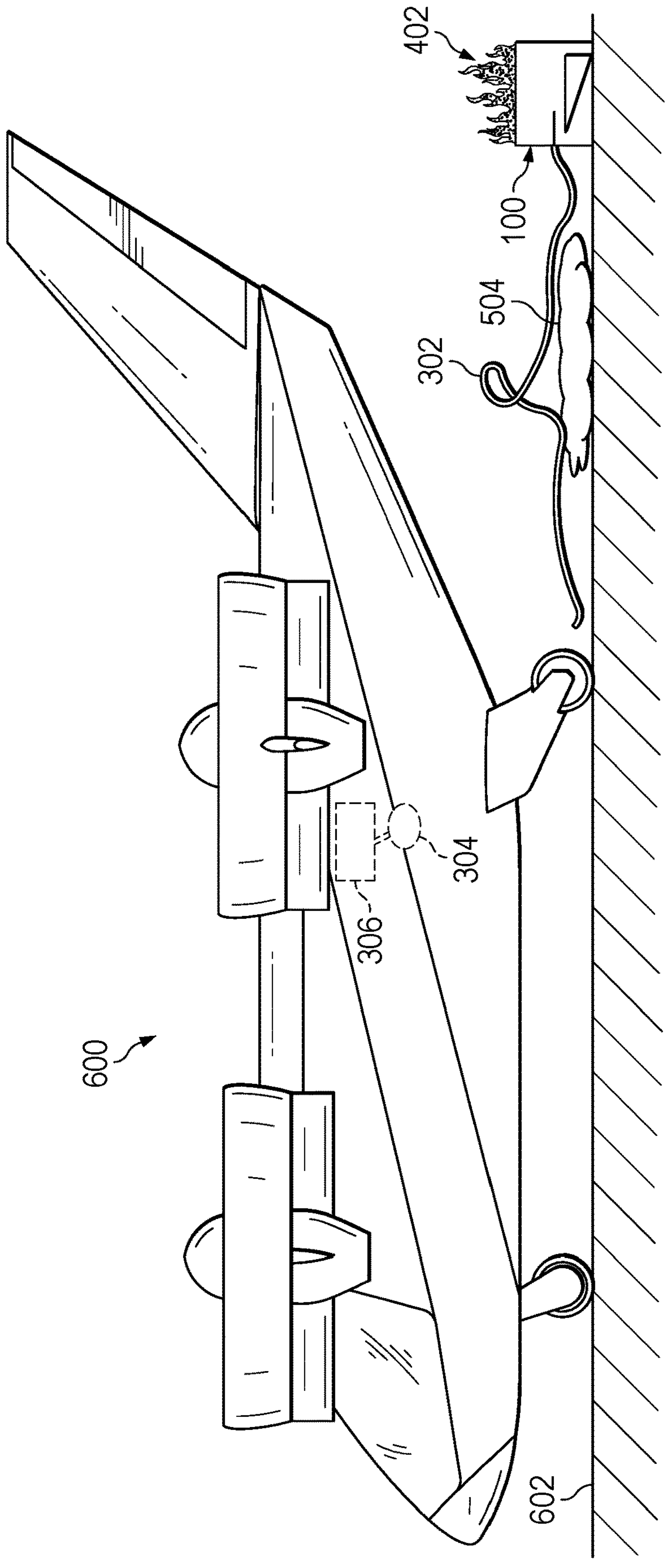
FIG. 6 is a perspective view of an eVTOL aircraft with an ejected battery module, in accordance with one or more embodiments of the present disclosure.

FIG. 6 is a perspective view of an eVTOL aircraft 600 after an emergency landing, with an ejected battery pack 100, in accordance with one or more embodiments of the present disclosure. In the event that the aircraft 600 malfunctions, crashes, or is about to crash, the control system 306 can detach the tether 302 from the aircraft. For example, the control system 306 can detach the tether 302 from the aircraft 600 when the altitude of the aircraft falls below a predetermined threshold. The aircraft 600 or the shock absorber 304 can include a latch restraint that is operable via one or more actuators controllable by the control system 306. Alternatively, the tether 302 may not be decoupled from the aircraft 600. Because the battery pack 100 was positioned aft of the aircraft's 600 center, the battery pack 100 may land aft of the aircraft 600. The parachute 504 may deflate and the wings 502 may retract. In another embodiment, the tether 302 can selectively detach from the battery pack 100. For example, the control system 306 can operate an actuator to decouple the tether 302 from the battery pack 100. The control system 306 can then activate an actuator (e.g., winch) disposed within the aircraft 600 to retract the deployed tether 302 at least partially within the aircraft 600 once the battery pack is detached from the tether to prevent additional hazards.

Figure 7:
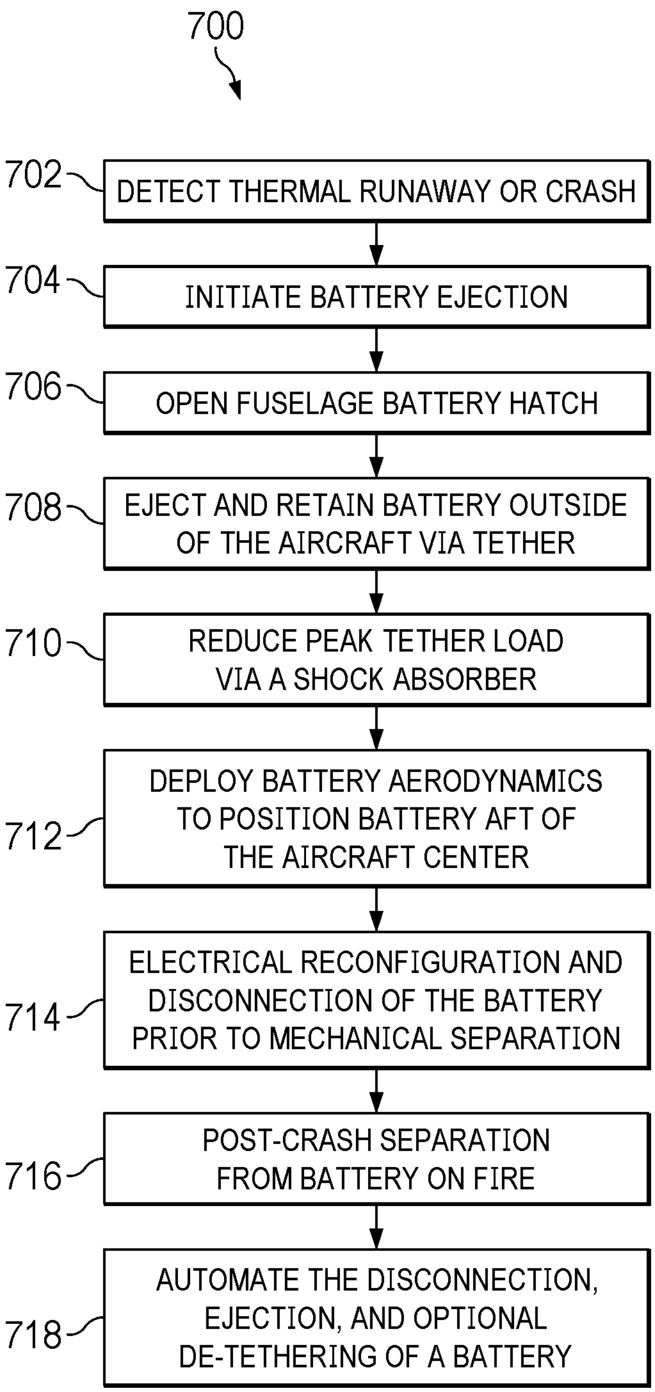
FIG. 7 is a flowchart diagram of an ejectable battery system control logic, in accordance with one or more embodiments of the present disclosure.

FIG. 7 is a flowchart diagram of an ejectable battery system control logic 700, in accordance with one or more embodiments of the present disclosure. The control logic 700 can be implemented as an algorithm on a processor (e.g., controller, microprocessor, FPGA, ASIC, CPU, computer, server, etc.), or other suitable system. Additionally, the control logic 700 can be achieved with software, hardware, firmware, an API, a network connection, a network transfer protocol, HTML, DHTML, JavaScript, JSON, system bus, other suitable application, or a suitable combination thereof. The control logic 700 can interface electrical components to control electrical components (e.g., power-routing buses, diacs, switches, etc.) and mechanical components (e.g., actuators, latches, etc.) using logic processors.

In an embodiment, the control logic 700 can interface with a memory for storing information about an aircraft, aircraft assets, flight information, alerts, and battery modules in a plurality of network-based, non-transitory storage devices having the collection of aircraft information thereon. Additionally, the control logic 700 can interface the memory with a networked computer processor operably coupled to the memory and capable of executing machine-readable instructions to perform program steps. The control logic 700 implementing hardware components (e.g., processor) can be capable of executing machine-readable instructions to perform program steps and operably coupled to a memory for storing the information about the aircraft, aircraft assets, flight information, alerts, and battery modules.

The control logic 700 can leverage the ability of a computer platform to spawn multiple processes and threads by processing data simultaneously. The speed and efficiency of the control logic 700 can be greatly improved by instantiating more than one process for monitoring a status of the aircraft, aircraft assets, flight information, alerts, and battery modules. However, one skilled in the art of programming will appreciate that use of a single processing thread may also be utilized and is within the scope of the present disclosure. The control logic 700 can also be distributed amongst a plurality of networked computer processors. The control logic 700 of the present embodiment begins at step 702.

At step 702, in one embodiment, the control logic 700 can detect a thermal runaway, an impending crash, or a crash. The control logic 700 can leverage information from the control system 306, the BMU, the BMS, the FCC, or other aircraft sensors. For example, the control logic 700 can detect a thermal runaway of a battery pack 100 when the temperature of the battery module 100 exceeds a predetermined threshold stored in memory. The control logic 700 can detect an impending crash of an aircraft based on analysis of the altitude, speed, direction, or other suitable metric, satisfying a predetermined threshold. For example, the metric can satisfy a predetermined threshold by meeting, exceeding, or failing to meet the predetermined threshold. The control logic 700 then proceeds to step 704.

At step 704, the control logic 700 can initiate the ejection of one or more battery modules. For example, once the control logic 700 detects a thermal runaway, crash, or impending crash, the control logic 700 can mechanically and electronically decouple one or more aircraft components. The control logic 700 then proceeds to step 706.

At step 706, the control logic can open a fuselage battery hatch. For example, the control logic 700 can operate one or more actuators operantly coupled to a battery hatch of the fuselage to open and close the battery hatch. The control logic 700 then proceeds to step 708.

At step 708, the control logic 700 can eject a battery module and retain the battery module outside of the aircraft via a tether. The control logic 700 can interface electrical components to control mechanical components (e.g., actuators, latches, etc.) using logic processors. For example, the control logic 700 can operate one or more actuators to release one or more latches securing the battery module to the aircraft. The control logic 700 can also operate a tether to position the ejected battery outside of the aircraft. For example, the control logic 700 can operate a winch to controllably position the ejected battery module to a position proximate the aircraft. The control logic 700 then proceeds to step 710.

At step 710, the control logic 700 can reduce the peak tether load via a shock absorber. For example, the control logic 700 can control one more actuators to couple the tether to a shock absorber coupled to the aircraft. The control logic 700 then proceeds to step 712.

At step 712, the control logic 700 can deploy battery aerodynamics to position the battery module aft of the aircraft's center. For example, the control logic 700 can control one or more actuators to deploy one or more wings, parachutes, or other suitable drag inducing component. The aerodynamics can be operably coupled to the battery module, a battery module housing, or a battery module tray, among others. Alternatively, the aerodynamics can be coupled to the tether and not the battery module, or both. The control logic 700 then proceeds to step 714.

At step 714, the control logic can electrically reconfigure and disconnect the battery module prior to battery ejection. The control logic 700 can interface electrical components to control electrical components (e.g., power-routing buses, diacs, switches, etc.) using logic processors. The BMU can also provide access to the power supplied by the battery via one or more electrical connectors, by electrically coupling or decoupling a battery module 100. The control logic 700 then proceeds to step 716.

At step 716, control logic 700 can facilitate post-crash or pre-crash separation of the battery module from the aircraft. In the event that the aircraft malfunctions, crashes, or is about to crash, the control logic 700 can detach the tether from the aircraft. For example, the control logic 700 can detach the tether from the aircraft when the altitude of the aircraft falls below a predetermined threshold. The crashed aircraft or the shock absorber can include a latch restraint that is operable via one or more actuators controllable by the control logic 700. The control logic 700 then proceeds to step 718.

At step 718, the control logic 700 can automate the monitoring, disconnection, ejection, and optional de-tethering of a battery module. For example, control logic 700 can incorporate one or more data analysis techniques including a threshold for determining one or more characteristics of the aircraft. The threshold can include a measured value constantly monitored against expected data stored in memory. When the measured data breaches (or otherwise fails to satisfy) the threshold, the control logic 700 can generate an alert of the condition. For example, the threshold breach can trigger the disconnection, ejection, and de-tethering of a battery module by the control logic 700. One or more of the disconnection, ejection, and de-tethering of a battery module can be processed by the control logic 700 without human interaction. Alternatively, one or more of the disconnection, ejection, and de-tethering of a battery module can be triggered by user interaction. For example, the control logic 700 can interact with the user through a GUI. The control logic 700 can receive the input in the form of a user interaction with a client device operating the GUI. In another example, a pilot can trigger at least one action related to the ejectable battery system. The control logic 700 then terminates or awaits further input to repeat the steps described herein.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

None of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. The scope of the claims can include one, some, or portions of any of the embodiments disclosed herein, either alone or in combination. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An ejectable battery system, comprising:
an aircraft;
a battery pack disposed within the aircraft and configured to provide power to the aircraft;
a battery hatch configured to eject the battery pack from the aircraft during flight;
a tether operably coupled to the aircraft and the battery pack and configured to selectively retain the battery pack attached to the aircraft after ejection of the battery pack from the aircraft; and
a shock absorber operably coupled to the tether and the aircraft and configured to reduce a peak tether load exerted on the tether by the battery pack after ejection from the aircraft.

2. The system of claim 1, wherein the battery pack is disposed within a fuselage of the aircraft.

3. The system of claim 1, wherein the battery pack is disposed within a wing of the aircraft.

4. The system of claim 1, wherein the battery pack is ejected during a thermal runaway failure of the battery pack or aircraft malfunction.

5. The system of claim 1, wherein a crash energy of the aircraft's structure is decreased after battery pack ejection.

6. The system of claim 1, wherein the battery pack is a part of a swappable battery system.

7. The system of claim 1, wherein electrical reconfiguration and disconnection of the battery pack occurs prior to ejection.

8. The system of claim 1, further comprising one or more wings, parachutes, or other suitable drag inducing component, operably coupled to the battery pack and configured to aerodynamically position the tethered battery pack aft of the aircraft's center.

9. The system of claim 1, further comprising a load management system configured to retain the aircraft center of gravity during and after battery pack ejection.

10. The system of claim 1, wherein the tether is a conducting tether configured to maintain electrical communication between the ejected battery pack and the aircraft to allow the ejected battery to continue to deliver power to the aircraft.

11. The system of claim 1, further comprising a control system configured to manage disconnection, ejection, and optional de-tethering of the battery pack.

* * * * *